US009734192B2

(12) United States Patent
Czarlinska et al.

(10) Patent No.: US 9,734,192 B2
(45) Date of Patent: Aug. 15, 2017

(54) PRODUCING SENTIMENT-AWARE RESULTS FROM A SEARCH QUERY

(71) Applicant: Oracle International Corporation, Redwood Shores, CA (US)

(72) Inventors: Aleksandra Czarlinska, San Jose, CA (US); Asha Tarachandani, Newark, CA (US); Shubhro Jyoti Roy, Mountain View, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 396 days.

(21) Appl. No.: 14/032,587

(22) Filed: Sep. 20, 2013

(65) Prior Publication Data

US 2015/0088894 A1 Mar. 26, 2015

(51) Int. Cl.
*G06F 17/30* (2006.01)
(52) U.S. Cl.
CPC .............. *G06F 17/30401* (2013.01)
(58) Field of Classification Search
CPC ........... G06F 17/30867; G06F 17/2785; G06F 17/30389
USPC ......... 707/999.003, 713, 769, E17.014, 759, 707/706, 748, 754, 755, 792, 999.004, 707/710, 719, 722, 736, 738, 802, 707/E17.005, E17.045, E17.059, E17.108, 707/E17.111, E17.112, E17.122, 728, 707/743, 758, 760, 781, 791, 999.001, 707/999.005, 999.1, E17.017, E17.047, 707/E17.055, E17.058, E17.067, E17.084, 707/E17.087, E17.107, E17.13, E17.136,
(Continued)

(56) References Cited

U.S. PATENT DOCUMENTS 5,418,948 A * 5/1995 Turtle ............... G06F 17/30011
707/700
2009/0055370 A1* 2/2009 Dagum ............ G06F 17/30194
(Continued)

OTHER PUBLICATIONS

Pang & Lee et. al. , "Thumbs up? Sentiment Classification using Machine Learning Techniques", 2002 url: http://www.cs.cornell.edu/home/llee/papers/sentiment.pdf.
(Continued)

*Primary Examiner* — Jay Morrison
*Assistant Examiner* — Ken Hoang
(74) *Attorney, Agent, or Firm* — Vista IP Law Group, LLP

(57) ABSTRACT

A method, system, and computer program product for information retrieval and sentiment assessment. The method parses a sentiment-aware query to isolate one or more lexical terms to be included in a lexical retrieval of documents containing the lexical terms. The parsing of the query includes parsing the query to isolate portions of the query to be included in the configuration of a sentiment analysis of the retrieved documents. The documents retrieved based on the lexical terms are processed so as to generate a sentiment assessment, and the sentiment found in the retrieved documents might be correlated to terms that are not present in the lexical terms. The sentiment assessment is presented as a "positive" or "negative" indication, or as a sentiment assessment score. The sentiment portion of the query can specify an area of interest, and/or can specify a user-selected classifier model that is used to process the retrieved documents.

29 Claims, 10 Drawing Sheets

(58) Field of Classification Search
USPC .......... 707/E17.14, 634, 638, 692, 694, 705,
707/711, 715, 723, 732, 737, 739, 749,
707/753, 763, 765, 770, 771, 779, 805,
707/999.01, 999.101, 999.102; 704/9,
704/275, 4
See application file for complete search history.

(56) References Cited

U.S. PATENT DOCUMENTS

| | | | | |
|---|---|---|---|---|
| 2009/0216524 A1* | 8/2009 | Skubacz | ............ | G06F 17/2785 |
| | | | | 704/9 |
| 2009/0282019 A1* | 11/2009 | Galitsky | ........... | G06F 17/30634 |
| 2013/0018894 A1* | 1/2013 | Qiao | ................ | G06F 17/30719 |
| | | | | 707/748 |

OTHER PUBLICATIONS

Zhang et. al., HP Labs, "Combining Lexicon-based and Learning-based Methods for Twitter Sentiment Analysis", 2011 url: http://www.hpl.hp.com/techreports/2011/HPL-2011-89.pdf.

Google, "Building a Sentiment Summarizer for Local Service Reviews", 2008 url: www.ryanmcd.com/papers/local_service_summ.pdf.

Turney et. al, "Thumbs Up or Thumbs Down? Semantic Orientation Applied to Unsupervised Classification of Reviews", 2002.

\* cited by examiner

6A00 →
```
ctx_query.result_set(
'data-index',
'quantitative easing AND ABOUT(investing)',
'<ctx_result_set_descriptor>
<hitlist hits="10" order="SCORE DESC MYDATE DESC">
  <snippet radius="25" max_length="200"/>
  <rowid/>
  <score/>
</hitlist>
<count/>
</ctx_result_set_descriptor>
', :rs);
```

FIG. 6A

6B00 →
```
ctx_query.result_set(
'data-index',
'quantitative easing AND ABOUT(investing)
AND SA(ABOUT(stocks))=Positive',              ← 1B12₁
'<ctx_result_set_descriptor>
<hitlist hits="10" order="SA DESC SCORE DESC MYDATE DESC">
  <snippet radius="25" max_length="200"/>
  <rowid/>
  <score/>
<sentiment>
  <item value = "interest1 + preferences"/>
  <item value = "interest2 + preferences"/>     ← 1B12₂
  <item value ="interestN + preferences"/>
</sentiment>
<sentiment classifier= "classifier_N" >
  <item value ="interest1 + preferences"/>
  <item value ="interest2 + preferences"/>
  <item value ="interestN + preferences"/>
<group SA="interest1"/>
<group SA="interest2"/>
</sentiment>
</hitlist>
<count/>
</ctx_result_set_descriptor>
', :rs);
```

FIG. 6B

PRODUCING SENTIMENT-AWARE RESULTS FROM A SEARCH QUERY

FIELD

The disclosure relates to the field of information retrieval and document search technologies and more particularly to techniques for producing sentiment-aware results from a sentiment-aware search query.

BACKGROUND

Searching on the basis of search terms or keywords has become pervasive. Users rely on documents, postings, links or other materials (e.g., "hits") to be returned from a lexical query. However, users are often looking for meaning or insight that might be present in the hits. Indeed, insight is often present in the hits/documents, but the sought-after insight is often buried in the content of the hits—and often using terms that are different than the lexical terms used in the original lexical query. In legacy searching, the user must read through the hits in order to extract meaning, insight, and sentiment. Users need a way to explicitly express the user's desire to gain insight into the sentiment (e.g., positive sentiment, negative sentiment, sentiment score, etc.) reflected in the retrieved documents. Moreover, a user would want to explicitly express the general area of inquiry for which the sentiment is desired to be understood, even though the general area of sentiment might be orthogonal to the lexical terms.

In particular, users need a way to form queries that not only return a list of lexical "hit" results, but that also return results after performance of some semantic or sentiment analysis that addresses the user's informational need.

Even modern search engines do not provide a mechanism for users to explicitly indicate that they want to "mine" sentiment in addition to receiving the raw "lexical hit" search results. The needs of such users are acute enough that often painstaking and largely manual efforts are undertaken in order to "mine" sentiment from lexical hit results. Worse, often a user's informational or insight needs are ultimately satisfied from mined results that derive from terms, concepts or entities that are not present within the lexical terms or keywords specified in the lexical query. What is needed is a technique or techniques such that a user can express an informational need or insight need in conjunction with a user's specified lexical search terms.

Legacy approaches fail to offer the capabilities of the herein-disclosed techniques for explicitly specifying a desire for sentiment analysis, and/or for producing sentiment-aware results from a sentiment-aware search query. Therefore, there is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for producing sentiment-aware results from a sentiment-aware search query.

The method commences upon receiving a query, then parsing the query to isolate one or more lexical terms to be included in a retrieval of documents containing the one or more lexical terms. The parsing of the query includes parsing the query to isolate a portion or portions of the query to be included in the configuration of sentiment analysis of the retrieved documents. The documents retrieved based on the lexical terms are processed so as to generate a sentiment assessment, and the sentiment found in the retrieved documents might be correlated to terms that are not present in the lexical terms. The sentiment assessment is presented as a "positive" or "negative" indication, or as a sentiment assessment score. The query can specify an area of sentiment interest, and, if specified, a user-selected classifier model is used to process the retrieved documents. Sentiment assessment of the retrieved documents uses an entity extractor to extract a theme or name, and/or uses an entity extractor to search for related concepts, possibly also using a thesaurus.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 6A and FIG. 6B form a comparison chart showing portions of a query that are used to facilitate lexical retrieval, and portions that are used to facilitate sentiment analysis.

DETAILED DESCRIPTION

Figure 1A:
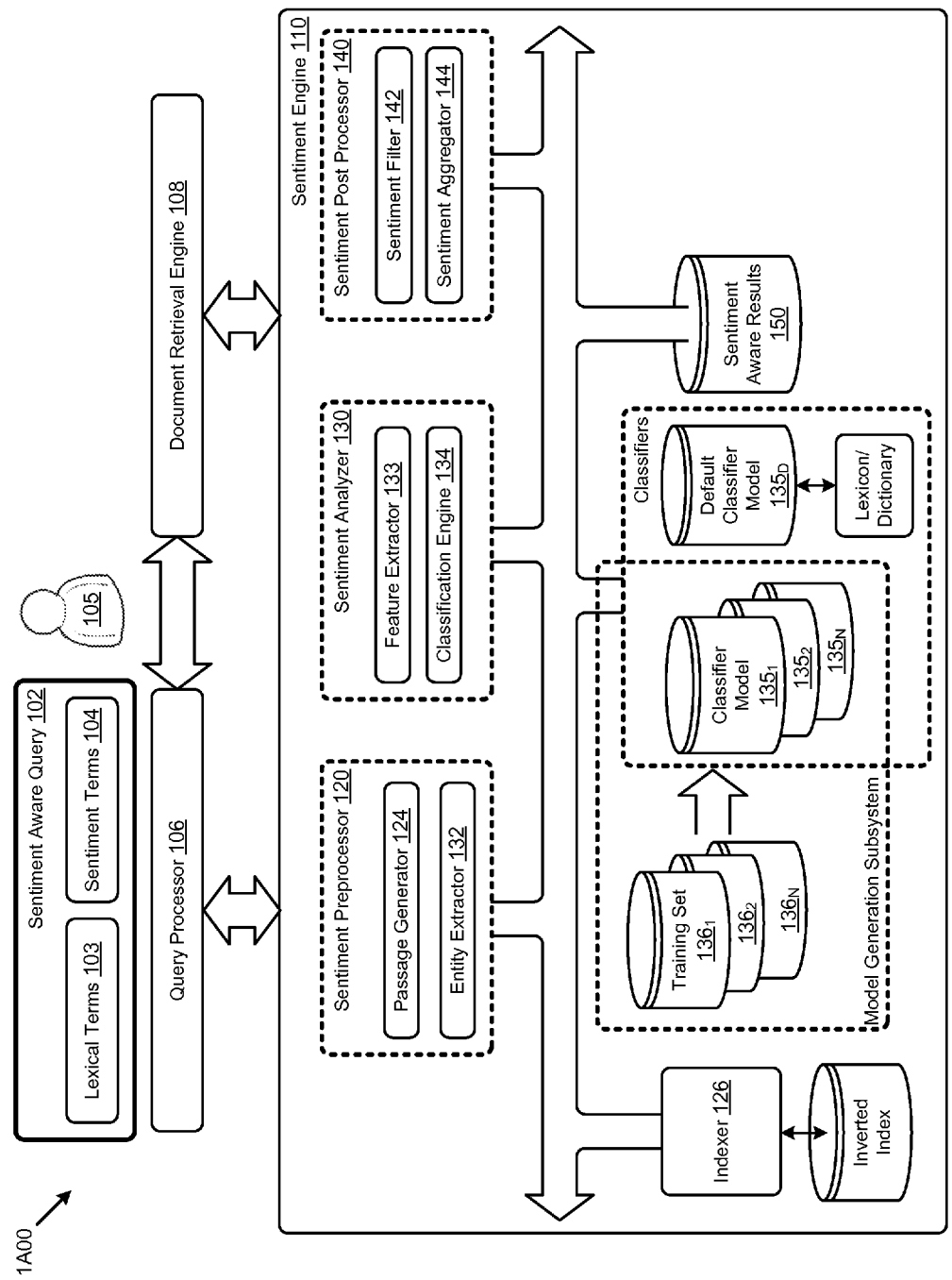
FIG. 1A is a block diagram of an environment for producing sentiment-aware results from a sentiment-aware search query, according to some embodiments.

Some embodiments of the present disclosure address the problem of how to define a sentiment-aware search query and how to produce sentiment-aware results from such a sentiment-aware search query. Some embodiments are directed to approaches for how to produce a sentiment-aware search query and some embodiments are directed to approaches to produce sentiment-aware results. More particularly, disclosed herein and in the accompanying figures are exemplary environments, methods, and systems for producing sentiment-aware results from a sentiment-aware search query.

OVERVIEW

In order to direct a document retrieval system to perform sentiment analysis on the basis of a query, users need a technique to explicitly express a desire to gain insight into the sentiment (e.g., positive sentiment, negative sentiment, sentiment score, etc.) reflected in the documents retrieved by the query. A user might want to explicitly express a general area of inquiry for which the sentiment is desired to be understood, even though the general area of sentiment might be orthogonal to the lexical terms. For example, portions of a query (e.g., a keyword and/or query expression) can be defined to allow a user to explicitly express the user's desire to gain insight into the sentiment of a set of documents. Execution of such a query can retrieve not only documents that are "hits", but also, execution of such a query can return results (possibly filtered results) after performing user-specified sentiment analysis operations over the hits.

The discussion herein addresses techniques for expressing the user's desire to gain insight into the sentiment(s) of a set of documents, and for providing direct answers, analysis and insights based on sentiment-aware analysis of search results. Techniques for forming a sentiment-aware query are discussed, and techniques for controlling sentiment-aware results are described in several embodiments.

More specifically:
- A sentiment-aware query can invoke sentiment analysis to be performed not only for explicitly indicated words (e.g., 'stocks') but also for concepts (e.g., all synonyms of 'stocks').
- A sentiment-aware query can specify filtering and/or grouping of sentiment-aware results. For example, a sentiment-aware query can specify that a search is to be performed for documents containing the term 'quantitative easing', but only those that are deemed to have a positive sentiment (e.g., "bullish") about 'stocks' are returned in the sentiment-aware results. Documents that contain the term 'quantitative easing', but have a negative sentiment (e.g., "bearish") about 'stocks' can be filtered out, and are not returned in the sentiment-aware results
- A sentiment-aware query can invoke sentiment analysis to be performed pertaining to a term or terms found in documents, which terms are different than the search terms used to retrieve the documents over which sentiment analysis is performed. For instance, a sentiment-aware query can express a user's desire to understand the sentiment about 'stocks' in all documents returned from a query on 'quantitative easing'.

In contrast, a legacy query using the keywords/keyphrases {"weather" "San Francisco"} or {"temperature" "San Francisco"} would produce pages of results that merely enumerate the top-ranked weather-related websites (from which this answer may be extracted by the user by browsing).

In contrast to such legacy query techniques and legacy search results, the herein-disclosed sentiment analysis makes some sense of the search results. In this example, the returned results might provide the insight that it is a "pleasant 78 degrees as of 6 pm tonight". In other examples, the sense can come in the form of "aboutness" concerning user-specified lexical terms or recurring concepts or themes, or extracted entities such as people or places. Or, a query might be formed using a particular syntax having particular semantics. An example is given in FIG. 1B.

As another example, consider a user who wants to know, "What features of laptop computers do customers like most?" A legacy search engine would mostly return links to online sales sites and online product review repositories, which the user would then need to read in order to make some sense of the documents in the sites returned as hits. An improved approach would be to perform a sentiment-aware analysis of the results returned, relate the findings of the sentiment-aware analysis with respect to a particular user-specified sentiment, and then return (for example) a listing of the top most liked features. As can now be appreciated, a query and query results that include sentiment-awareness is more likely to addresses the user's informational needs. Additional examples are given in Table 1.

The embodiments described herein differ from traditional keyword searches in many ways. Discussed hereunder are:
- A syntax for forming sentiment-aware queries. The disclosed syntax allows the user to ask for sentiment analysis using terms that may differ from the lexical terms provided in a query. For example, it might be that a user wishes to understand the sentiment about "stocks" as may be found throughout documents returned based on a query specifying the lexical keyphrase, "quantitative easing". The syntax for forming sentiment-aware queries can include specification of filtering or ranking based on sentiment. For example, the user can specify that search results pertaining to "quantitative easing" are to be post-processed and filtered so as to return only documents or pages that are deemed to have a "positive sentiment" assessment (e.g., "like") regarding "stocks".
- A processing data flow such that sentiment analysis can be performed on the documents returned from a lexical search. Some of the disclosed processing data flows operate on concepts (e.g., synonyms of "stocks") and entities (e.g., people, places) as well as on any words or phrases specified in the sentiment-aware query. Analysis and scoring can be given in a break-down summary for each occurrence of the concepts, entities, words, or phrases within a document, or analysis and scoring can be aggregated into a summary score pertaining to the entire document or set of documents.

DEFINITIONS

Some of the terms used in this description are defined below for easy reference. The presented terms and their respective definitions are not rigidly restricted to these definitions—a term may be further defined by the term's use within this disclosure.
- The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.
- As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form. Reference is now made in detail to certain embodiments. The disclosed embodiments are not intended to be limiting of the claims.

DESCRIPTIONS OF EXEMPLARY EMBODIMENTS

FIG. 1A is a block diagram of an environment 1A00 for producing sentiment-aware results from a sentiment-aware search query. As an option, one or more instances of environment 100 or any aspect thereof may be implemented in the context of the architecture and functionality of the embodiments described herein. Also, the environment 100 or any aspect thereof may be implemented in any desired environment.

As shown, a user 105 specifies a sentiment-aware query 102, where a sentiment-aware query is comprised of lexical terms 103 and sentiment terms 104. The sentiment-aware query is received by a query processor 106, which uses at least some of the lexical terms when retrieving information (e.g., websites, documents, summaries, databases, hits, etc.) using a document retrieval engine 108 that in turn retrieves information from an inverted index produced by the indexer 126.

The query processor 106 implements one or more techniques for isolating sentiment-aware query constructions. The query processor provides the sentiment-aware query to a sentiment engine 110 (possibly including the bounds and semantics of the isolated sentiment-aware query constructions), and the document retrieval engine 108 provides retrieved information (e.g., websites, documents, summaries, databases, hits, etc.) to the sentiment engine 110. The sentiment engine, having access to the sentiment-aware query and having access to the retrieved information (e.g., possibly including a hit list) and any documents identified in the hit list, can perform operations in order to produce sentiment-aware results 150.

In the specific embodiment of FIG. 1A, the sentiment engine is partitioned into a sentiment preprocessor 120, a sentiment analyzer 130, and a sentiment post processor 140. When the documents identified in the hit list have been considered by the sentiment engine 110, sentiment-aware results 150 can be provided to the user 105 and/or can be stored in persistent storage to later access.

In the specific embodiment of FIG. 1A, the sentiment preprocessor 120 comprises a passage generator 124 and an entity extractor 132. The sentiment preprocessor is discussed as pertaining to FIG. 3.

In the specific embodiment of FIG. 1A, the sentiment post processor 140 comprises a sentiment filter 142 and a sentiment aggregator 144. The sentiment post processor is discussed as pertaining to FIG. 5.

In the specific embodiment of FIG. 1A, the sentiment analyzer 130 comprises an feature extractor 133 and a classification engine 134, which classification engine in turn may implement machine learning techniques. Some machine learning techniques use training sets (e.g., training set $136_1$, training set $136_2$, training set $136_N$, etc.) to train classifier models. Pre-generation of classifier models can use domain-specific training sets. The result of the training includes domain-specific classifier models (e.g., classifier model $135_1$, classifier model $135_2$, classifier model $35_N$, etc.). In some embodiments, a default classifier model $135_D$ is provided. In the embodiment shown, the default classifier model $135_D$ does not need pre-training.

As given in the embodiment of FIG. 1A, sentiment analysis is performed on documents retrieved using a document retrieval engine, which results are at least initially returned based on lexical terms in a query. A sentiment-aware query comprises a combination of lexical terms 103 and sentiment terms 104, which terms can be processed separately (e.g., by a document retrieval engine, and/or by a sentiment engine). Illustrative portions of such a sentiment-aware query is given in FIG. 1B, as follows.

Figure 1B:
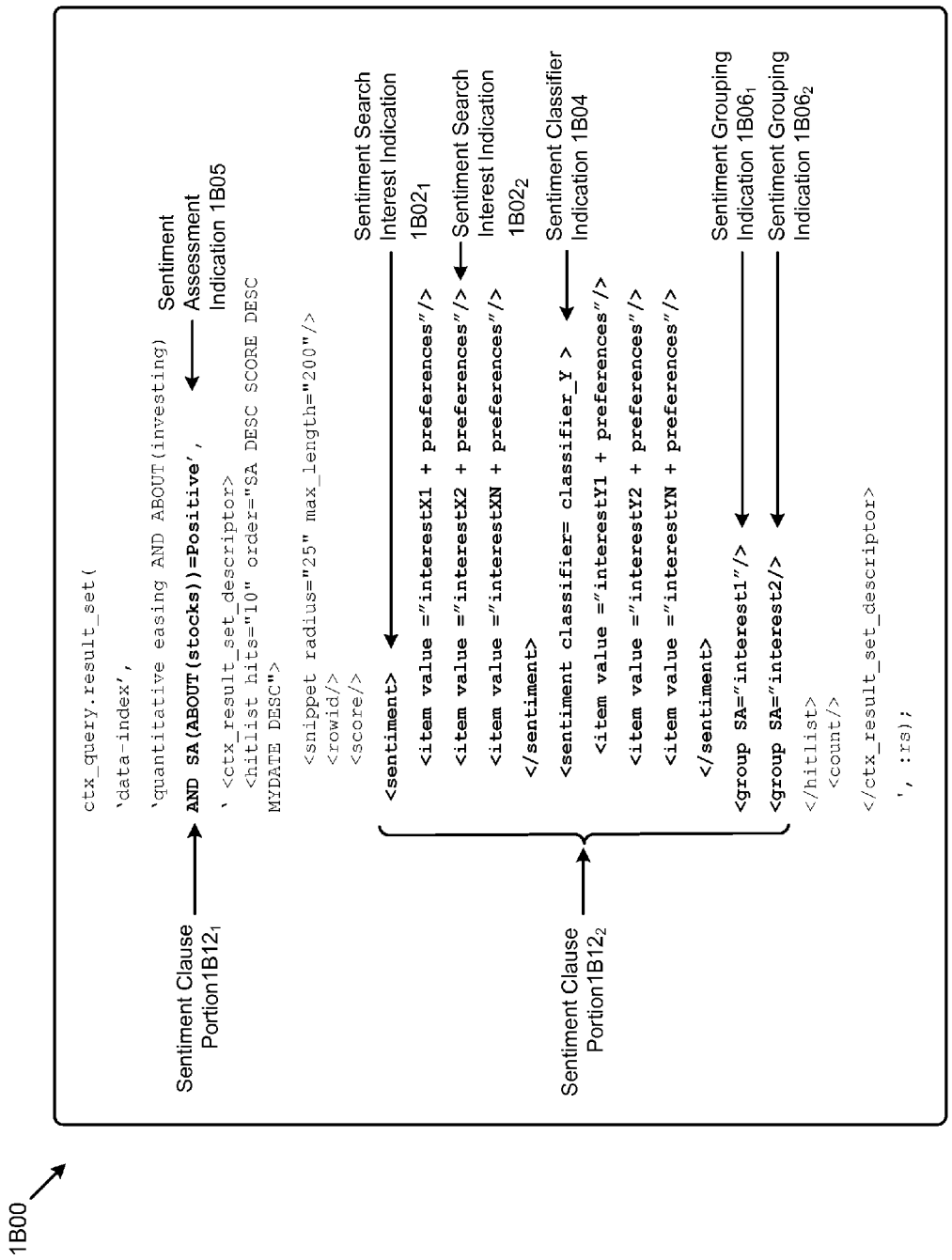
FIG. 1B depicts portions of a query for producing sentiment-aware results from a sentiment-aware search query, according to some embodiments.

FIG. 1B depicts portions of a query for producing sentiment-aware results from a sentiment-aware search query, according to some embodiments.

The sentiment-aware search query 1B00 comprises a portion of the query that includes query terms for use in a lexical search. As shown, the query includes a lexical specification comprising the words "quantitative easing". Further, the query includes one or more sentiment predicates that specify aspects of a desired sentiment analysis (e.g., sentiment clause portion $1B12_1$ and sentiment clause portion $1B12_2$).

For example, and as shown, a sentiment predicate (e.g., the sentiment clause portion $1B12_1$) can include a syntax (see sentiment assessment indication 1B05) whereby the user can specify that search results pertaining to one or more lexical search terms are to be post-processed so as to return only documents or pages that are deemed to have a particular sentiment assessment (e.g., a "positive sentiment") with respect to a particular sentiment term.

In other cases, a sentiment-aware query can specify that sentiment analysis is to be performed for passages of documents that are about a particular topic. In the example shown, the sentiment analysis is specified to be performed on returned documents that include a "Positive" sentiment about investing.

In other cases, a sentiment-aware query can specify filtering operations such that only passages that are deemed to have a particular sentiment (e.g., a "Positive" sentiment) are returned. Returned results can be grouped in accordance with grouping instructions expressed in the sentiment-aware query.

Other operations can be specified in a sentiment-aware query. For example the COUNT of the number of passages returned that are deemed to have a particular sentiment can be calculated by a query processor.

As shown, the sentiment clause portion $1B12_2$ includes a sentiment search interest indication (see sentiment search interest indication $1B02_1$ and sentiment search interest indication $1B02_2$). Such a sentiment search interest indication can be used to explicitly indicate a search area for which the sentiment is desired to be understood. In this example, the sentiment search indication is given using the keyword "sentiment". Further, in this case, aspects of the sentiment clause portion $1B12_2$ are given in XML syntax within an XML "<sentiment>" tag.

Various features, preferences, options, etc. are possible. The example provided in the sentiment clause portion $1B12_2$ includes a sentiment classifier indication 1B04. The sentiment classifier indication serves to suggest a context in which to interpret a term. For example, the term "flat" might be associated with a negative sentiment when used in the context of discussions on "beer-making", but connote a neutral or positive sentiment when used in discussions about "engineered wood flooring". In some cases a user might not specify a classifier, in which case a default classification approach (e.g., using default classifier model $135_D$) can be used.

In this example, the user has specified various interests against which sentiment analysis is to be performed. As shown, XML elements "<item>" appear within the "<sentiment>" tag. And, each of the shown "<item>" tags includes an attribute "value" and a corresponding attribute value "interestX1+preferences". The attribute value "interestX1+preferences" is purely illustrative. A user would include an attribute value within an "<interest>" tag, which attribute value would suggest a user-specified area of interest such as "bonds".

In this example, the user desires to receive results that are grouped by interest. Accordingly, the user has specified groupings using grouping indications (e.g., sentiment grouping indication $1B06_1$, sentiment grouping indication $1B06_2$). Results of the sentiment analysis are so grouped.

Now, as earlier indicated, the sentiment-aware search query 1B00 includes a portion of the query that includes query terms for use in a lexical search. And, the sentiment-aware search query 1B00 includes a portion of the query that includes specifications used in sentiment analysis. In some embodiments, the lexical search and the sentiment analysis are performed using separate facilities. For example, the lexical search can be performed using a document retrieval engine, and the sentiment analysis can be performed using a sentiment engine 110 (e.g., in conjunction with a document retrieval engine). Examples of such separate processing are now briefly discussed using the comparison chart of FIG. 2.

Figure 2:
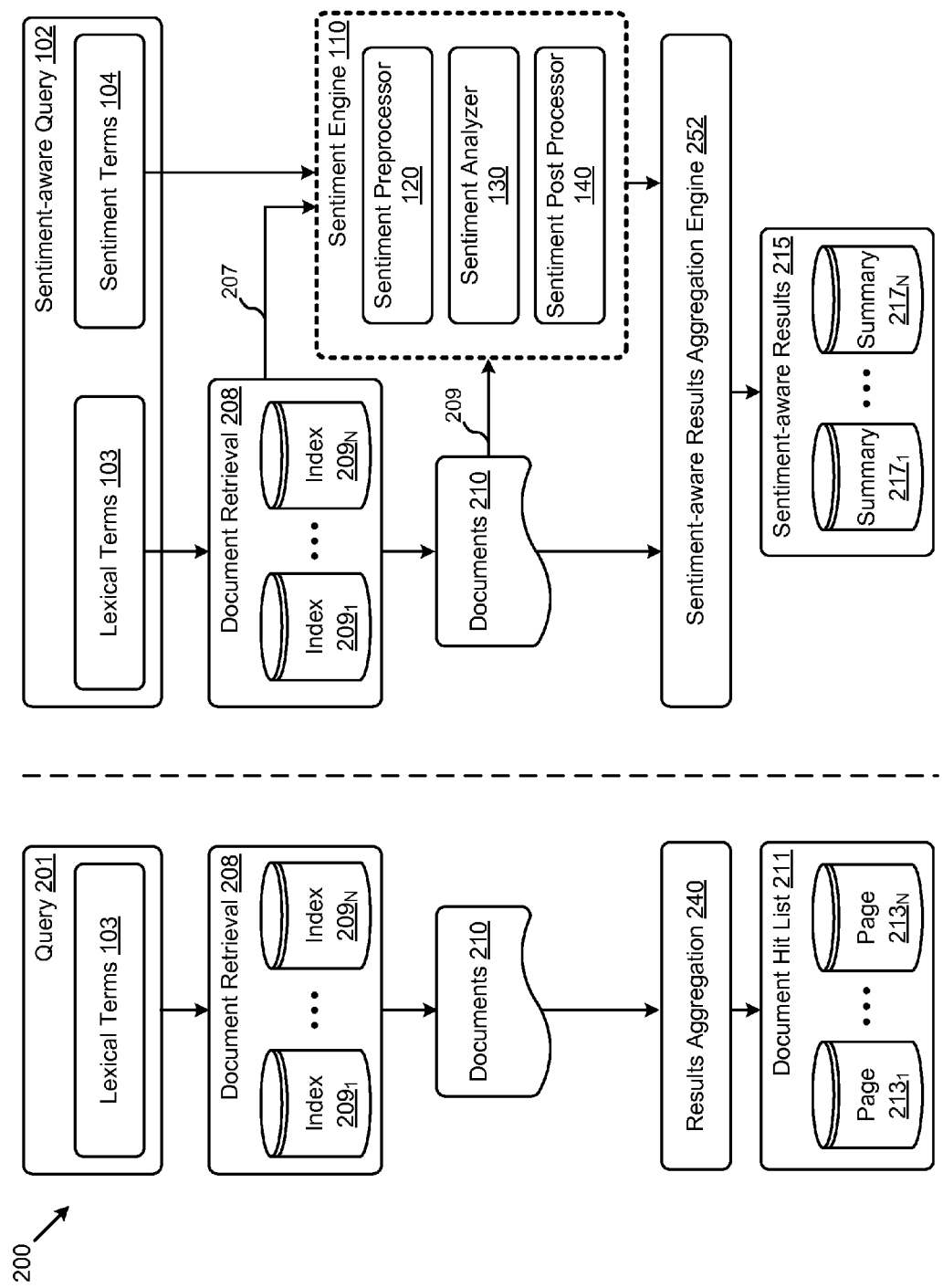
FIG. 2 is a comparison chart showing operations used in producing sentiment-aware results from a sentiment-aware search query, according to some embodiments.

FIG. 2 is a comparison chart 200 showing operations used in producing sentiment-aware results from a sentiment-aware search query. As an option, one or more instances of comparison chart 200 or any aspect thereof may be implemented in the context of the architecture and functionality of the embodiments described herein.

As shown, a query 201 comprises lexical terms 103, which are used in conjunction with some form of document retrieval facility 208, which document retrieval can comprise indexes (e.g., index $209_1$, index $209_N$, etc.) for fast searching and retrieval of documents that contain the lexical terms given in the query 201. Further, a user preference for a particular index can be specified in the lexical portion of the query. For example, see the specification of the index "data-index" shown in FIG. 1B. Any number of documents 210 can be returned from the document retrieval facility, and the returned results are formatted for the user, possibly using some form of results aggregation 240. For example, the operations comprising results aggregation 240 may produce a document hit list 211, which constituent documents can be segregated into a series of pages (e.g., page $213_1$, page $213_N$, etc.).

In contrast to the query 201 (e.g., see left portion of FIG. 2), a sentiment-aware query 102 comprises sentiment terms to be used in making sense of results returned from the document retrieval facility (see path 207 and path 209). In the specific embodiment of FIG. 2, the sentiment-aware query 102 and results from the document retrieval facility 208 (see path 207), as well as documents returned from the document retrieval facility are provided to components of a sentiment engine 110. The documents 210 as well as outputs from the sentiment engine 110 are provided to a sentiment-aware results aggregation engine 252, which in turn can format portions of sentiment-aware results 215 into summaries (e.g., summary $217_1$, summary $217_N$, etc.) for presentation to the user.

As shown in FIG. 2 the concept and usage of a sentiment-aware query is distinguished from sentiment-aware results. In a sentiment-aware query, a user can issue a keyword query accompanied by sentiment-based restrictions (e.g., in a sentiment clause portion of a sentiment-aware query). The semantics corresponding to the sentiment clause portion of a sentiment-aware query serve to filter the results so as to produce sentiment-aware results. In sentiment-aware results, in addition to presenting the results from the lexical query, a specified sentiment about a result is also displayed.

To illustrate, and strictly as an example, a user might want to understand, "What is likely to happen to U.S. stock prices in the next few months given subsequent applications of quantitative easing by the U.S. Federal Reserve?" Note that the question is a real-world question to which an answer might comprise both factual elements (e.g., the total dollar amount of historical quantitative easing by the U.S. Federal Reserve) as well as elements of opinion (e.g., since no one can fully predict the future).

In one approach, a user might issue a query 201 comprising lexical terms 103, namely "predictions for stock prices". This would likely return a list of top related web sites or articles gathered from a variety of sources on the World Wide Web (e.g., a document hit list 211). The user would then review the documents given in the hit list to see if the context is relevant to the question at hand. In many cases, some of the documents might be discussing predictions based on factors that do not include quantitative easing. However, in this example, the user is really interested in stock price relationships to quantitative easing. Even after reviewing the documents of the hit list to obtain a relevant result set, the user still needs to read the documents to determine what the prevailing prediction actually is (e.g., will stock prices will go up, or will stock prices go down, or will stock prices stay the same).

The right side of FIG. 2 includes a sentiment engine 110 that automatically reads the documents to determine a relationship to the prevailing prediction.

Determining the user's interest from a given sentiment-aware query can be facilitated using a sentiment preprocessor 120. Illustrative operations employed to hypothesize a user's interest from a given sentiment-aware query are now discussed.

As given in Table 1, a lexical component can have an association to one or more interest components. The associations given in Table 1 are given as keyword associations, however other associations are possible (e.g., an "aboutness" association, a "like" association, a "thematic" association, etc.). Further, statistical metrics (e.g., confidence) and quantitative limits (e.g., confidence=>90%) can be specified using the syntax of a sentiment-aware query.

TABLE 1

| Topic map | |
|---|---|
| Lexical Component | Interest |
| Camera | Lens |
| Camera | Megapixels |
| Camera | Flash |
| Stock predictions | BofA |
| Stock predictions | NYSE |

Continuing the "stocks" example, Table 2 gives a sentiment-aware query. Such a query provides the mechanism through which queries can be constrained to only return results satisfying certain criteria based on sentiment analysis. In the following example of (see Table 2) the user specifies the sense of "aboutness" using the ABOUT clause (e.g., the token "ABOUT" can be handled as a reserved word). In this case the user seeks documents that are about quantitative easing (e.g., comprising documents that include not only the exact lexical keywords, but which include synonyms related to the lexical keywords). Further, the user has indicated in this query that the user desires to see results of sentiment analysis (SA) that pertain to "stocks" where the sentiment is deemed to be "positive". Further filtering or aggregation can be specified. In this case the user has indicated a desire to see results that are at once:

about quantitative easing, and also have a positive sentiment about stocks.

TABLE 2

Sentiment-aware query

| Line | Code |
|---|---|
| 1 | ctx_query.result_set('index','ABOUT(quantitative easing) AND SA(stocks, positive)',' |
| 2 | <ctx_result_set_descriptor> |
| 3 |    <hitlist hits="10" order="SCORE DESC MYDATE DESC"> |
| 4 |       <sentiment> |
| 5 |          <item value ="bonds"/> |
| 6 |       </sentiment> |
| 7 |    </hitlist> |
| 8 |    <count/> |
| 9 | </ctx_result_set_descriptor> |
| 10 | ', :rs); |

As can be seen in line 5, the user further wishes to obtain the sentiment analysis on documents that contain occurrences of the keyword "bonds". This example includes the case where, for a set of documents matching the lexical search and sentiment filter, the user wishes to also obtain the sentiment pertaining to "bonds" if it occurs in the set of documents.

A sentiment-aware query in the syntax as given in Table 2 contains codification of the user's interest (e.g., "<item value="bonds"/>"), associations (e.g., "ABOUT (quantitative easing)"), and specific sentiments sought after (e.g., SA(stocks, positive)). Such codifications can be used in semantic analysis. In particular, and as shown in FIG. 2, such codifications can be used by the sentiment engine 102, the sentiment-aware results aggregation engine 252, and in preparing the sentiment-aware results 215.

The embodiment of sentiment engine 110 as given in FIG. 2 includes a preprocessor module, a classification engine, and a post processor, each of which components is discussed in turn in the following paragraphs.

Figure 3:
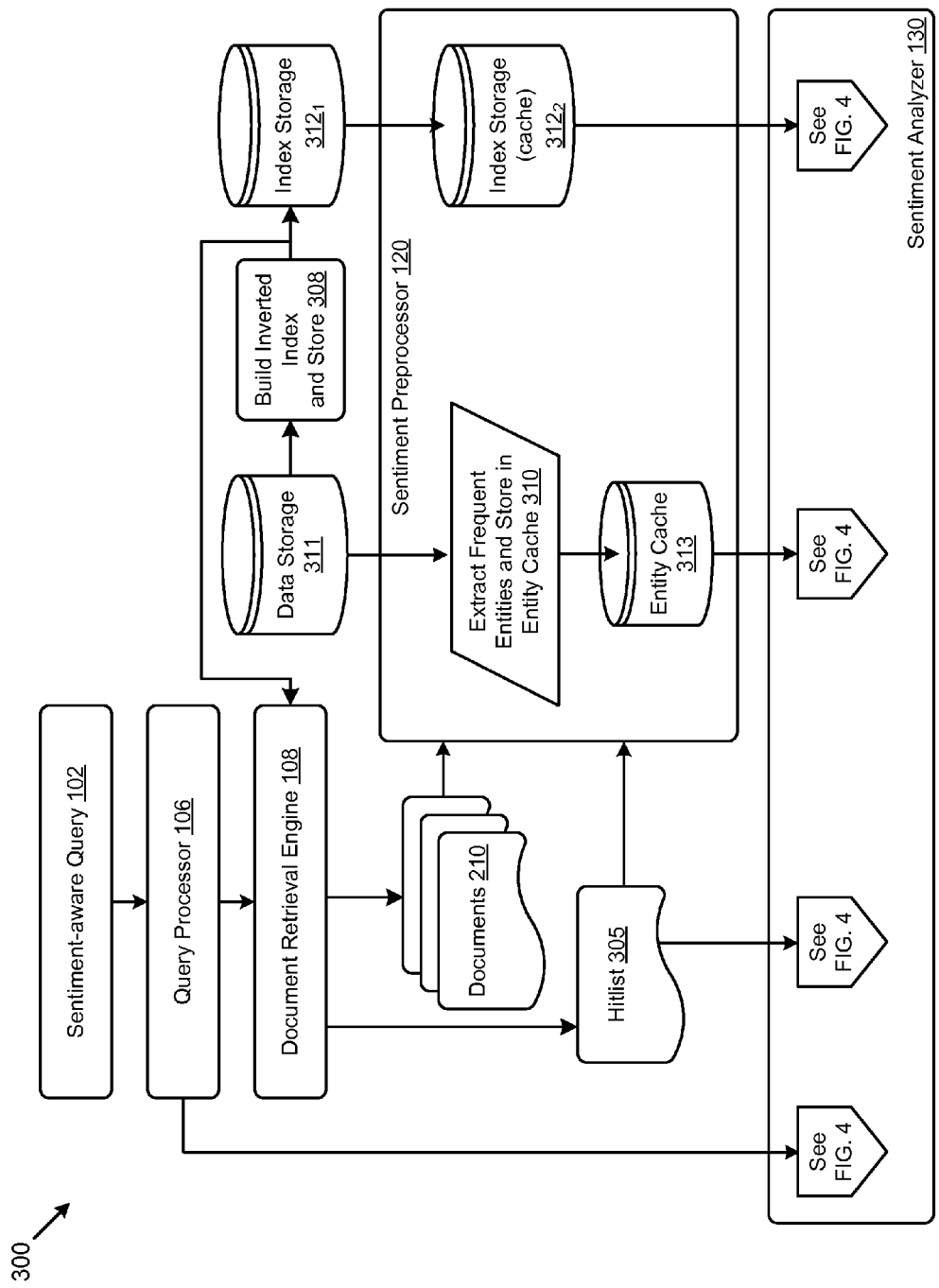
FIG. 3 is a block diagram showing a setting for a sentiment preprocessor used in systems for producing sentiment-aware results from a sentiment-aware search query, according to some embodiments.

FIG. 3 is a block diagram 300 showing a setting for a sentiment preprocessor used in systems for producing sentiment-aware results from a sentiment-aware search query. As an option, one or more instances of block diagram 300 or any aspect thereof may be implemented in the context of the architecture and functionality of the embodiments described herein. Also, the block diagram 300 or any aspect thereof may be implemented in any desired environment.

In the shown setting, a sentiment-aware query 102 is passed to a query processor 106. The query is parsed by the query processor and user-specified parameters are recognized for syntax and semantics. Next, the document retrieval engine fetches the matching documents from a repository (e.g., data storage 311). Document retrieval provides a listing of hits (e.g., hitlist 305) and a set of documents (e.g., documents 210). The repository accessible to the document retrieval engine 108 can be populated at any moment in time. Moreover, the inverted index produced by the indexer 126 can be populated asynchronously with the population of the repository, which in turn can occur asynchronously with processing of a query.

The sentiment preprocessor 120 operates on documents 210 retrieved using document retrieval engine 108. The documents can be processed so as to identify stopwords, perform stemming, tokenize, and otherwise prepare passages of a document for indexing. An inverted index is built (e.g., see process 308) so as to facilitate fast retrieval of a set of documents or passages given a particular indexed word.

The extent of the documents returned by the document retrieval engine can be known as a result of the contents of a particular container (e.g., a directory, a folder), or can be known as a result of the contents or entries in the hitlist 305.

The index can be built in a batch operation, and/or can be built incrementally, and saved persistently into index storage $312_1$. Such an index storage can use any known facility for storage, possibly including use of caching and/or other fast retrieval techniques. Moreover, at any point in the generation of the inverted index, the frequency of occurrence of any index term can be known from the index storage.

The index storage is accessed by a process (e.g., see operation 310) to extract frequently occurring entities, and the most frequently occurring entities can be made accessible via an entity cache 313. The documents 210, hitlist 305, entity cache 313, and index storage $312_2$ are all accessible by a sentiment analyzer 130 (as shown). Exemplary embodiments of a sentiment analyzer comprise one or more entity extractors, which in turn can use a custom dictionary of entities, and/or a set of rules for extracting entities. The partitioning and operations of a sentiment analyzer are now briefly discussed.

Figure 4:
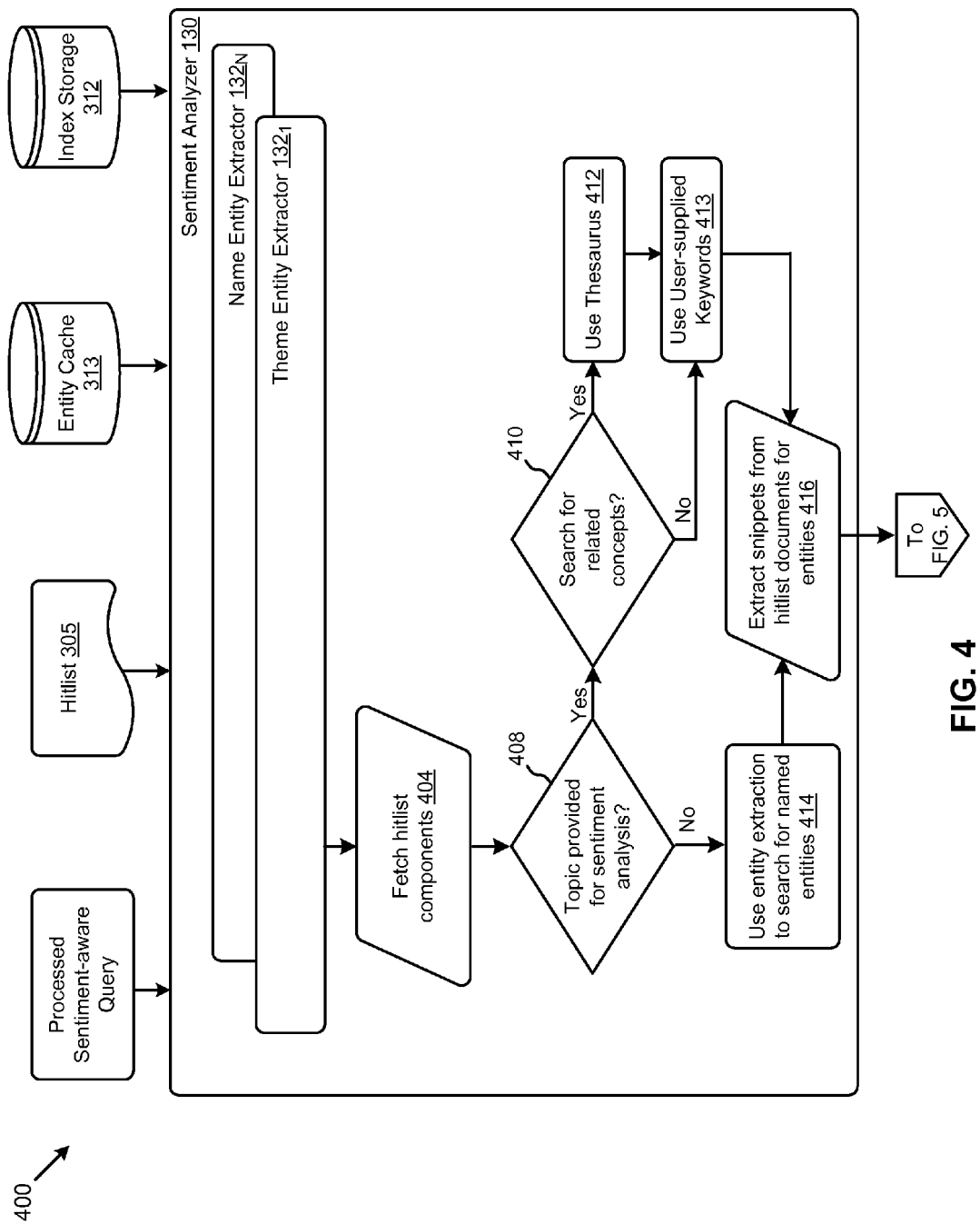
FIG. 4 depicts a sample partitioning of operations within an entity extractor used in systems for producing sentiment-aware results from a sentiment-aware search query, according to some embodiments.

FIG. 4 depicts a sample partitioning 400 of operations within an entity extractor used in systems for producing sentiment-aware results from a sentiment-aware search query. As an option, one or more instances of sample partitioning 400 or any aspect thereof may be implemented in the context of the architecture and functionality of the embodiments described herein. Also, the sample partitioning 400 or any aspect thereof may be implemented in any desired environment.

The user may specify that entity extraction should be used for sentiment classification. One example is provided within the result set descriptor tags (e.g., see lines 2 through 9 of Table 2). In the case that a user specifies that entity extraction should be used, an entity extractor (e.g., theme entity extractor $132_1$, name entity extractor $132_N$, etc.) will extract named themes (e.g., trends), and named entities (e.g., organization names, locations, names of people, etc.) and then find the sentiment scores associated with such entities present in the document. Frequently occurring named entities will be stored in an entity cache at indexing time so as to improve performance at query time. Extracting entities, then filtering to include only statistically significant extracted entities, can result in a desirable and much more granular level of sentiment classification. Such a granular level of sentiment classification (e.g., at the entity level rather than a passage level or a document level) can often exhibit greater precision as compared to classification to the document level. For example, it is often the case that a single document contains multiple sentiments, each associated with different entities. Disambiguating different sentiments at the entity level often results in more accurate sentiment classification.

Again referring to uses of multiple entity extractors (e.g., theme entity extractor $132_1$, name entity extractor $132_N$, etc.) the engine performs a match on synonyms or other proxies for the provided keyword(s) using a thesaurus to smooth out the discreteness inherent to lexical matches. The keyword(s) and its match proxies are used to extract related keywords and/or concepts. In some cases sentiment classification and analysis is performed for all keywords and respective keyword proxies occurring in the documents of the hitlist set.

With the above understanding, an extractor can operate as follows:

Fetch hitlist components (see operation 404).

If a topic is provided, for example, in the sentiment-aware query (see decision 408), then if the sentiment-aware query specifies a search for related concepts user-supplied keywords are used (see decision 410). In certain cases (e.g., with or without a user-provided topic for sentiment analysis) further processing can include searching retrieved documents (e.g., hitlist components) to identify a plurality of terms that have the same meaning, and/or to identify a plurality of terms that refer to two or more related concepts. Some embodiments use a thesaurus 412, possibly in combination with any user-supplied keywords 413.

If a topic was not provided, for example, in the sentiment-aware query (see decision 408), then a default extractor is used to extract entities (see operation 414). In situations where a sentiment-aware query does not specify a topic or entity for which sentiment analysis should be performed, the default extractor is used to identify entities.

For the documents to be subjected to sentiment analysis, operation 416 serves to extract passages or snippets (further discussed below) from those documents, where the passages or snippets correspond to the extracted entities. This step comprises one or more searches through the documents in order to find occurrences of identified entities within the document and then extracts relevant passages of text surrounding these entities. Such passages can be subjected to rules to determine the beginning and ends of relevant portions. A passage that is shortened by application of the aforementioned rules is called a snippet. Snippets contain sentiments associated with the searched-for entities. The radius of a snippet can have a default radius length of about 25 words surrounding the entity/keyword, although shorter or longer snippets can occur. Shorter snippets often lead to higher precision while longer snippets may lead to higher recall.

Figure 5:
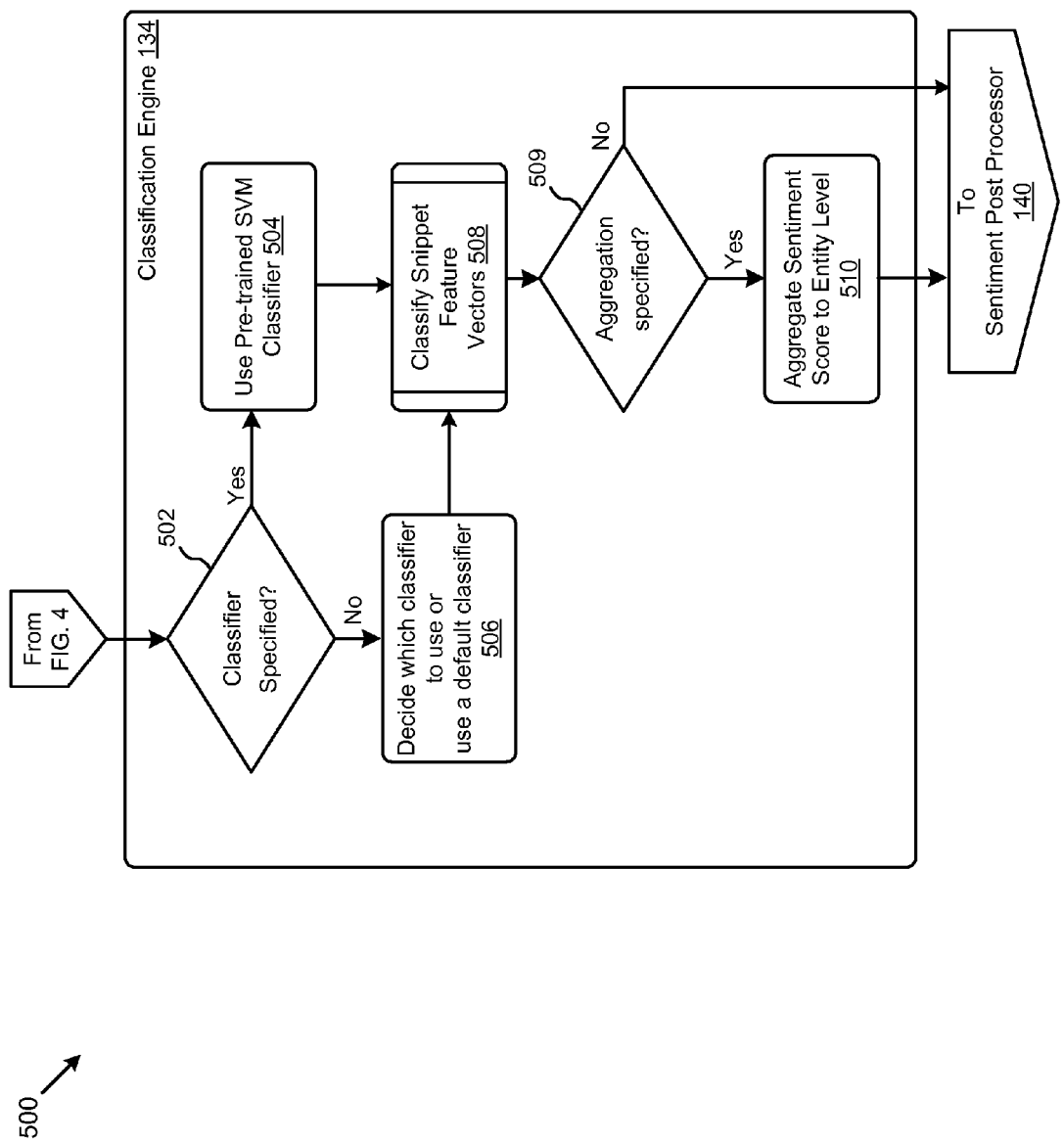
FIG. 5 depicts a set of classifier selection operations as used within a classification engine for producing sentiment-aware results from a sentiment-aware search query, according to some embodiments.

FIG. 5 depicts a set of classifier selection operations 500 as used within a classification engine 134 for producing sentiment-aware results from a sentiment-aware search query. As an option, one or more instances of classifier selection operations 500 or any aspect thereof may be implemented in the context of the architecture and functionality of the embodiments described herein. Also, the classifier selection operations 500 or any aspect thereof may be implemented in any desired environment.

Some embodiments are sentiment-aware with respect to a particular subject matter domain. Different training corpora can be used to build domain-specific sentiment classifiers. In some embodiments, domain specific models (e.g., domain-specific sentiment classifiers) are trained based on support vector machine (SVM) implementations.

As earlier discussed, sentiment awareness in search results is enabled when the user requests a sentiment analysis via a sentiment-aware query. A sentiment-aware query can also specify a particular classifier (e.g., a domain-specific, pre-trained classifier) that is then used in forming the sentiment results. If a particular classifier is not specified (see decision 502), an operation is performed (e.g., see operation 506) that selects a default or best available classifier corresponding to the topic for which sentiment results are requested.

One possibility for a default classifier model is to generate a classifier based on a subjectivity lexicon that defines sentiment scores for words used in a particular sense. As earlier indicated, generation of a classification model using such a dictionary does not need any pre-training. Sentiment scores for features presented in a feature vector are aggregated to compute a final sentiment score for the entire snippet and/or for a corresponding entity (see operation 510). Once a classifier is determined (e.g., see operation 504 or operation 506), the extracted snippet is transformed into a feature vector.

Table 3 shows a sample sentiment-aware query used to fetch sentiment aware results using a user-specified, domain-specific classifier (see line 3).

TABLE 3

| | Input result set descriptor |
|---|---|
| Line | Code |
| 1 | ctx_query.result_set('idx', 'quantitative easing', ' <ctx_result_set_descriptor> |
| 2 | <hitlist hits="10" order="SCORE DESC"> |
| 3 | <sentiment classifier="finance" confidence="DISPLAY"> |
| 4 | <item value ="bonds"/> |
| 5 | <item value ="stocks"/> |
| 6 | </sentiment> |
| 7 | <sentiment> |
| 8 | <item value ="stocks" type="about"/> |
| 9 | </sentiment> |
| 10 | </hitlist> |
| 11 | </ctx_result_set_descriptor> |
| 12 | ', :rs); |

Ahead of processing a query, the sentiment engine can be employed to generate classifier models. As shown in FIG. 1A, classifier models can be generated from training sets, and such training sets can be derived from documents deemed to fall into a particular context. The classifier models as depicted can be maximum-margin classifiers. Such classifiers learn a linear decision boundary in order to separate the positive training instances from the negative ones. In some cases the training models can handle non-linear decision boundaries. For example, a training model can handle a non-linear decision boundary by use of a kernel function defined to transform feature vectors into a higher dimension such that the classifier can learn a linear decision plane. Other known classification techniques can be used.

The classification step using a support vector machine involves transforming the feature vector into the dimension space of the trained classifier and then using the classification boundary to compute the sentiment score of the snippet (or feature vector). The classifier also computes a confidence score for the classification which is an indicator of how confident the classifier is of the computed score.

After the snippets have been classified (e.g., see operation 508), if aggregation is specified (see decision 509), then the respective computed scores are rolled up to a corresponding entity and/or rolled up to the document level.

Returning to the discussion of FIG. 1A, control passes to a sentiment post processor 140. Here sentiment filters can be applied, and a sentiment aggregator can be used to roll up and present scores at the entity level, and/or at the passage level, and/or at the document level. The aggregation can be stored as sentiment-aware results 150.

The returned sentiment-aware results 150 can be described on-the-fly using metadata such as XML to describe the organization of the sentiment-aware results. Table 3 presents an example of such metadata.

TABLE 4

Output result set interface

| Line | Code |
|---|---|
| 1 | <ctx_result_set> |
| 2 |    <hitlist> |
| 3 |       <hit> |
| 4 |          <sentiment> |
| 5 |             <value interest="stocks"> Positive </value> |
| 6 |             <confidence> 86 </confidence> |
| 7 |          </sentiment> |
| 8 |       </hit> |
| 9 |       ... |
| 10 |    </hitlist> |
| 11 |    <count> 7 </count> |
| 12 | </ctx_result_set> |

FIG. 6A and FIG. 6B form a comparison chart showing portions of a query that are used to facilitate lexical retrieval, and portions that are used to facilitate sentiment analysis.

The left side 6A00 presents portions of a query that are used to accomplish a lexical search. The right side 6B00 depicts an entire query, including portions of a query that are used to accomplish a sentiment analysis according to a user's specification. As shown in FIG. 6B, a user's desire for sentiment analysis is given in sentiment clause portion 1B12$_1$ and additional specifications pertaining to the user's desire for sentiment analysis is given in the sentiment clause portion 1B12$_2$.

The result set descriptor portion of the XML-based query (e.g., see FIG. 1B, and FIG. 6B) provides merely one technique for expressing a query together with a specification for how the query results should be presented. The presentation of results from sentiment analysis goes far beyond presentation of results from lexical searches. Below is a set of sentiment-aware query constructions as expressed using the result set interface.

TABLE 5

An example sentiment-aware query constructions

| Example (e.g., keyword and/or clause) | Comment/Description |
|---|---|
| data-index | Name of the inverted index for which the lexical query will be executed. |
| 'quantitative easing' and ABOUT(investing) | Lexical query that retrieves a result set (hits) based on the occurrence of the given lexical terms. May be comprised of keywords and/or a theme operator (e.g., ABOUT). |
| hits | Specifies or limits how many results to return from the lexical query. |
| order | Specifies how to order the hits that are returned. |
| snippet with radius and max length preferences | Specifies if phrases or text snippets for the hits should be shown. Snippets are extracted proximally from location where keyword(s) occurred in the hit. |
| rowid | Used primarily in a database use case. Show table row id for the documents that were hits. |
| score | Show the numerical score for each lexical hit. This score is different from the sentiment score. |
| count | Show total count of hits. |
| 'quantitative easing' and ABOUT(investing) and SA("ABOUT(keyword)", constraint) | Filter lexical query using the SA (sentiment-aware) operator. There can be any number of SA operators. Each SA operator accepts a keyword and a constraint. The keyword can be modified using the ABOUT theme operator. The constraint can be a judgment such as "positive", "negative", "neutral" or it can be a numerical score such as 1 or 10. |
| order = "SA desc" | Order the results returned by the lexical query using the sentiment associated with each result (ascending and descending). |
| sentiment | Perform sentiment analysis on results returned by the lexical query. Can be empty with no further specification. This causes uses of the default classifier applied to entities automatically extracted from the results of the lexical query. There can be any number of sentiment requests for the same lexical results. Each sentiment request can specify different options to use in the analysis (see sentiment classifier + preferences below). |
| sentiment classifier + preferences | Optional specification for which sentiment classifier model to apply. Specification includes name of the classifier and preferences. Classifier should be valid classifier trained during set-up time. A selection of preferences are provided below. |
| preference: confidence | Should the confidence of the classifier be shown along with the sentiment analysis. |
| item value + preferences | The 'interest' of the user for which sentiment analysis will be performed within the set of results returned by the lexical query. The 'interest' is specified via a keyword that may or may not differ from any of the keyword(s) in the lexical query. The 'interest' keyword can be modified using the preferences. |

TABLE 5-continued

An example sentiment-aware query constructions

| Example (e.g., keyword and/or clause) | Comment/Description |
|---|---|
| preference: type | Optional. Default type is 'keyword'. Can be set to 'about' to apply the theme operator to the 'interest'. |
| preference: radius | Optional. Increase/decrease the size of the text surrounding the 'interest' in the document that will be utilized for sentiment analysis. Default is automatically set to optimal (too big or too small may lose accuracy of analysis) |
| preference: max_length | Optional. Increase/decrease the max length of text surrounding the 'interest' in the document that will be utilized for sentiment analysis. |
| preference: agg | Optional. Default is TRUE. If the 'interest' occurred repeatedly in a hit resulting from the lexical query, the 'agg' specifies whether the sentiment analysis should be displayed for each occurrence or if the sentiment should be aggregated over all occurrences in the hit. |
| preference: max_inst | Optional. Pertains to agg. If agg = true, is there a max number of occurrences to consider (in case the interest occurs thousands of times). |
| group SA | Group sentiment-aware operator. Any number of group operators can be specified, one for each 'interest'. The group operator produces a count for each unique sentiment found for the 'interest'. For example the lexical query returned 10 hits. The group operator returns 'positive' with a count of 5, 'negative' with a count of 3 and 'neutral' with a count of 2. The sentiment could also be a score from 1-10 in which case counts would be returned for each score. Note: if agg = false, the counts may not add up to the total number of documents returned by the query. Rather they will add up to the total number of occurrences of the 'interest' in the hits. |

ADDITIONAL EMBODIMENTS OF THE DISCLOSURE

Additional Practical Applications

Figure 7:
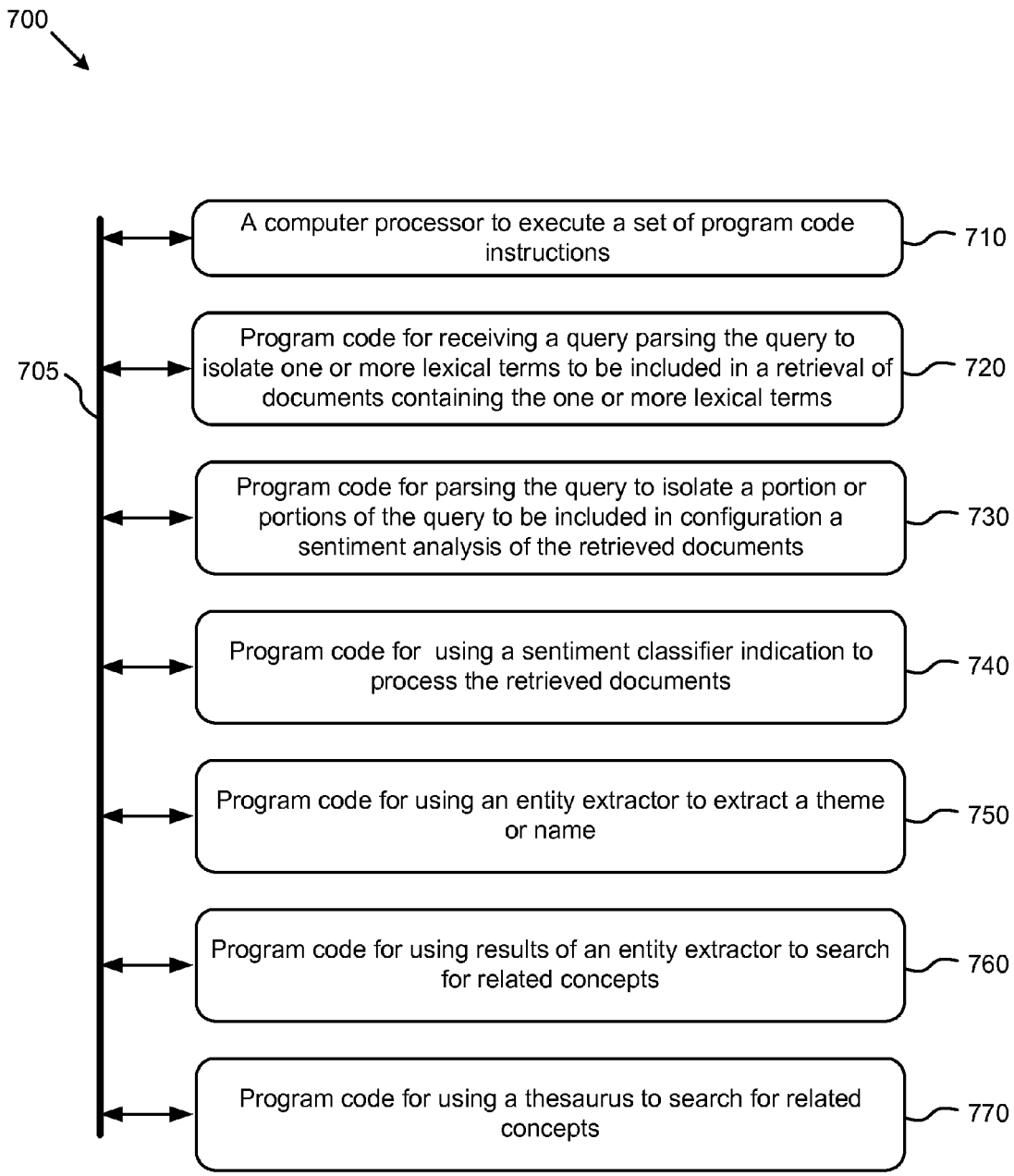
FIG. 7 is a block diagram of a system for producing sentiment-aware results from a sentiment-aware search query, according to some embodiments.

FIG. 7 is a block diagram of a system for producing sentiment-aware results from a sentiment-aware search query, according to some embodiments. As an option, the present system 700 may be implemented in the context of the architecture and functionality of the embodiments described herein. Of course, however, the system 700 or any operation therein may be carried out in any desired environment. As shown, system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The embodiment of FIG. 7 implements a portion of a computer system, shown as system 700, comprising a computer processor to execute a set of program code instructions (see module 710) and modules for accessing memory to hold program code instructions to perform: receiving a query (see module 720); parsing the query to isolate lexical terms to be included in a search and retrieval of documents containing the lexical terms (see module 730); and parsing the query to isolate a portion or portions of the query to be included in a sentiment analysis of the retrieved documents containing the lexical terms (see module 740).

In some embodiments processing further comprises using a sentiment classifier indication to process the retrieved documents (see module 750) and some embodiments use an entity extractor to extract a theme or name (see module 760) and/or can use an entity extractor to search for related concepts (see module 770), possibly also using a thesaurus.

Figure 8:
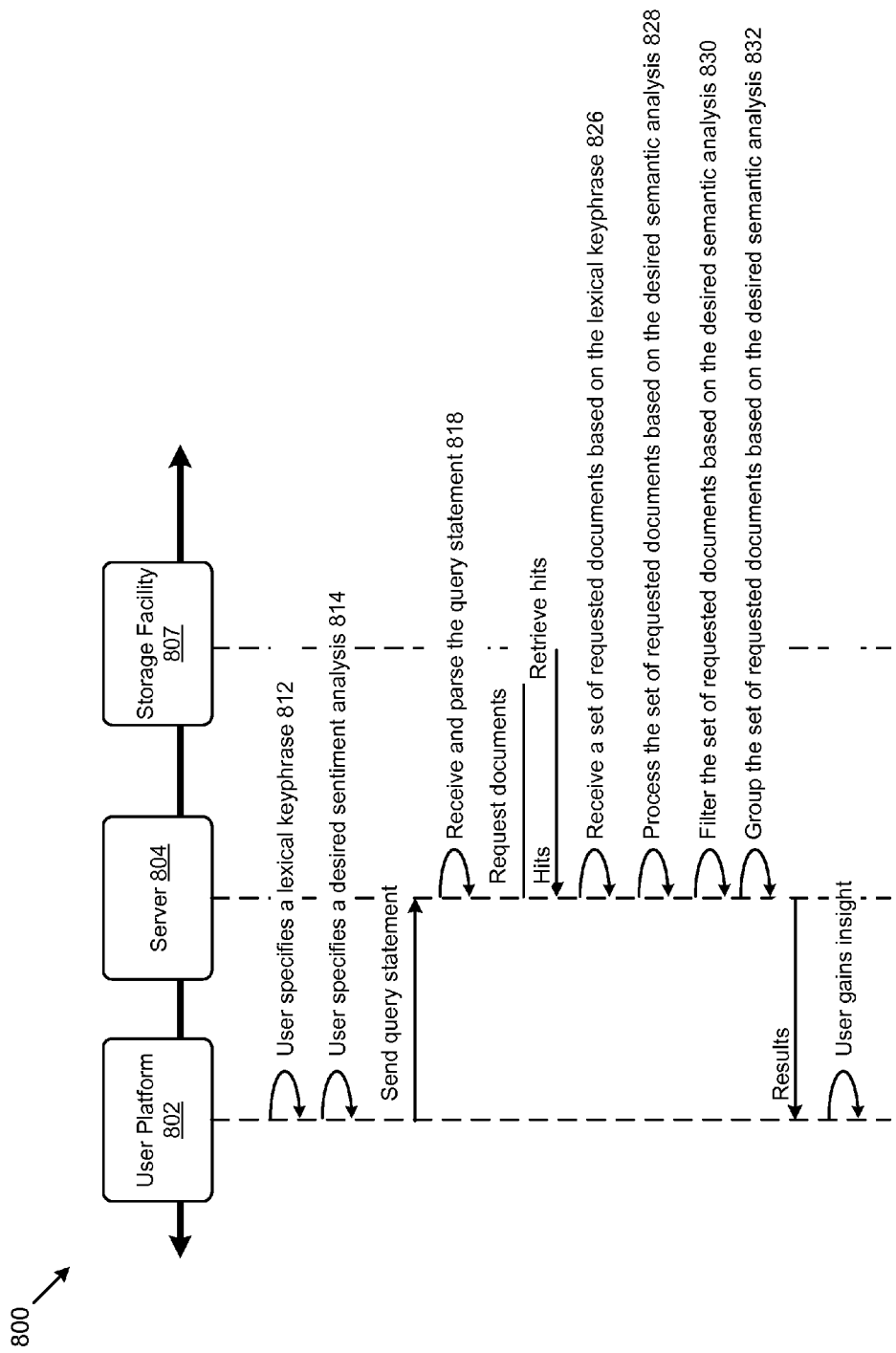
FIG. 8 is a block diagram of a system for producing sentiment-aware results from a sentiment-aware search query, according to some embodiments.

FIG. 8 is a block diagram of a system for producing sentiment-aware results from a sentiment-aware search query, according to some embodiments. As shown FIG. 8 depicts a system 800 comprising a user platform 802, an apparatus comprising a document storage area and a server 804 configured to execute a sequence of instructions, the instructions having steps for:

Parsing a database query language statement (e.g., see operation 818). As shown, the database language query statement comprises a lexical term portion (a user-specified lexical keyphrase 812) and sentiment analysis portion (e.g., a user-specified desired sentiment analysis indication 814);

Receiving (e.g., see operation 826), from a document storage area (e.g., a disk drive, a database, a storage facility 807, etc.), a set of documents containing one or more terms from the lexical term portion; and Performing sentiment-aware processing over at least some of the received set of documents using at least a portion of the sentiment analysis portion of the query language statement (e.g., see operation 828).

Some embodiments perform further processing, such as, formatting the results of the sentiment-aware processing. For example, such formatting can include filtering the sentiment-aware results (e.g., see operation 830), and/or performing grouping operations over the sentiment aware results (e.g., see operation 832) and/or performing other operations based on the received set of documents.

SYSTEM ARCHITECTURE OVERVIEW

Additional Practical Applications

Figure 9:
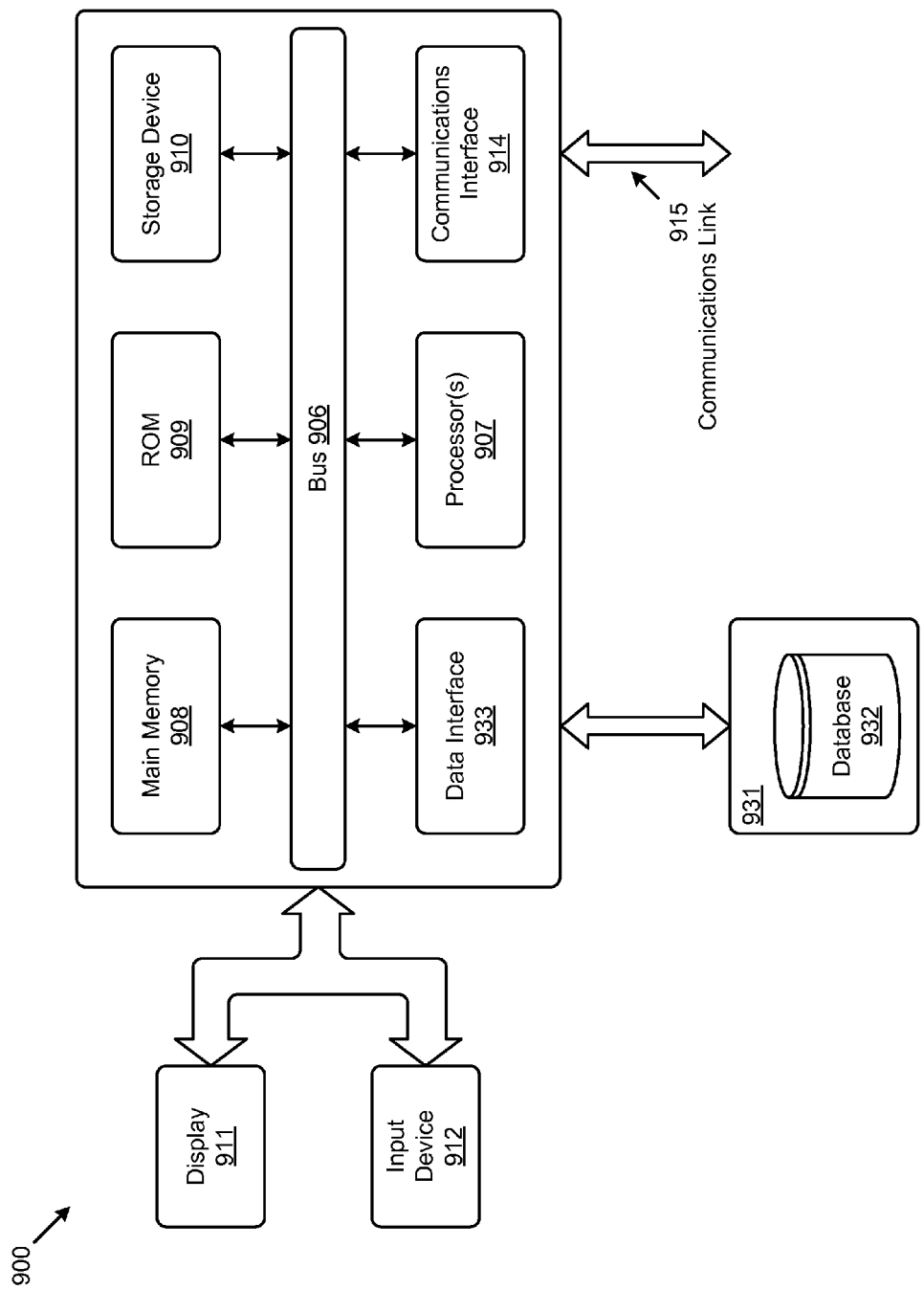
FIG. 9 depicts a block diagram of an instance of a computer system suitable for implementing an embodiment of the present disclosure.

FIG. 9 depicts a block diagram of an instance of a computer system 900 suitable for implementing an embodiment of the present disclosure. Computer system 900 includes a bus 906 or other communication mechanism for communicating information, which interconnects subsystems and devices, such as a processor 907, a system memory 908 (e.g., RAM), a static storage device (e.g., ROM 909), a disk drive 910 (e.g., magnetic or optical), a data interface 933, a communication interface 914 (e.g., modem or Ethernet card), a display 911 (e.g., CRT or LCD), input devices 912 (e.g., keyboard, cursor control), and an external data repository 931.

According to one embodiment of the disclosure, computer system 900 performs specific operations by processor 907 executing one or more sequences of one or more instructions contained in system memory 908. Such instructions may be read into system memory 908 from another computer readable/usable medium, such as a static storage device or a disk drive 910. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 907 for execution. Such a medium may take many forms, including but not limited to, non-volatile media and volatile media. Non-volatile media includes, for example, optical or magnetic disks, such as disk drive 910. Volatile media includes dynamic memory, such as system memory 908.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 900. According to certain embodiments of the disclosure, two or more computer systems 900 coupled by a communications link 915 (e.g., LAN, PTSN, or wireless network) may perform the sequence of instructions required to practice the disclosure in coordination with one another.

Computer system 900 may transmit and receive messages, data, and instructions, including programs (e.g., application code), through communications link 915 and communication interface 914. Received program code may be executed by processor 907 as it is received, and/or stored in disk drive 910 or other non-volatile storage for later execution. Computer system 900 may communicate through a data interface 933 to a database 932 on an external data repository 931. A module as used herein can be implemented using any mix of any portions of the system memory 908, and any extent of hard-wired circuitry including hard-wired circuitry embodied as a processor 907.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method comprising:
    receiving a single database query language statement, the single database query language statement comprising both a lexical portion having one or more lexical terms and a sentiment clause portion, the sentiment clause portion comprising: a sentiment-aware operator corresponding to a particular sentiment sought after, wherein the sentiment-aware operator comprises a first parameter and a second parameter that are both contained within the sentiment-aware operator, the first parameter corresponding to one or more sentiment terms such that a sentiment analysis is performed for the one or more sentiment terms and the second parameter corresponding to a sentiment assessment indication term corresponding to the particular sentiment to be searched for relative to the one or more sentiment terms, wherein at least one of the one or more sentiment terms in the sentiment clause portion differs from the one or more lexical terms in the lexical portion;
    parsing, by a computer processor, the single database query language statement to identify the one or more lexical terms to be used in a retrieval of documents containing the one or more of the lexical terms;
    parsing the single database query language statement based at least on the sentiment-aware operator to identify the one or more sentiment terms for performing the sentiment analysis and to identify the sentiment assessment indication term that pertains to the particular sentiment relative to the one or more sentiment terms;
    retrieving the documents that contain at least one of the one or more lexical terms; and
    after retrieving the documents that contain at least one of the one or more lexical terms, performing the sentiment analysis on the one or more sentiment terms found within the documents to identify the documents that pertain to the particular sentiment based at least in part on the sentiment assessment indication term.

2. The method of claim 1, wherein the single database query language statement comprises at least a portion of a SQL query.

3. The method of claim 1, further comprising returning sentiment analysis results based at least in part on the single database query language statement.

4. The method of claim 1 wherein the single database query language statement further comprises a filter portion to filter sentiment analysis results from performing the sentiment analysis for the one or more sentiment terms within the documents that contains the one or more lexical terms.

5. The method of claim 3, further comprising filtering the sentiment analysis results set based at least in part on a filtering or ranking specified in the single database query language statement.

6. The method of claim 5, wherein the filtering is based at least in part on scores of features presented in a feature vector.

7. The method of claim 1, wherein the sentiment assessment indication term comprises at least one of a positive judgment, a negative judgment, a neutral judgment or a numerical score.

8. The method of claim 1, wherein parsing the query comprises parsing group operator.

9. The method of claim 1, wherein parsing the query comprises parsing a sentiment classifier indication.

10. The method of claim 1, wherein sentiment analysis results are processed on a conceptual basis with respect to query terms that are not explicitly stated in the query language statement.

11. The method of claim 10, further comprising using a thesaurus to search for the same related concepts.

12. A computer program product embodied in a non-transitory computer readable medium, the computer readable medium having stored thereon a sequence of instructions which, when executed by a processor causes the processor to execute a process, the process comprising:
    receiving a single database query language statement, the single database query language statement comprising both a lexical portion having one or more lexical terms and a sentiment clause portion, the sentiment clause portion comprising: a sentiment-aware operator corresponding to a particular sentiment sought after, wherein the sentiment-aware operator comprises a first parameter and a second parameter that are both contained within the sentiment-aware operator, the first parameter corresponding to one or more sentiment terms such that a sentiment analysis is performed for the one or more sentiment terms and the second parameter corresponding to a sentiment assessment indication term corresponding to the particular sentiment to be searched for relative to the one or more sentiment terms, wherein at least one of the one or more sentiment terms in the sentiment clause portion differs from the one or more lexical terms in the lexical portion;
    parsing, by a computer processor, the single database query language statement to identify the one or more lexical terms to be used in a retrieval of documents containing the one or more of the lexical terms;
    parsing the single database query language statement based at least on the sentiment-aware operator to identify the one or more sentiment terms for performing sentiment analysis and to identify the sentiment assessment indication term that pertains to the particular sentiment relative to the one or more sentiment terms;
    retrieving the documents that contain at least one of the one or more lexical terms; and
    after retrieving the documents that contain at least one of the one or more lexical terms, performing the sentiment analysis on the one or more sentiment terms found within the documents to identify the documents that pertain to the particular sentiment based at least in part on the sentiment assessment indication term.

13. The computer program product of claim 12, wherein the single database query language statement comprises at least a portion of a SQL query.

14. The computer program product of claim 12, further comprising instructions for returning sentiment analysis results based at least in part on the single database query language statement.

15. The computer program product of claim 12, wherein the single database query language statement further comprises a filter portion to filter sentiment analysis results from performing the sentiment analysis for the one or more sentiment terms within the documents that contains the one or more lexical terms.

16. The computer program product of claim 14, further comprising instructions for filtering the sentiment analysis results set based at least in part on a filtering or ranking specified in the single database query language statement.

17. The computer program product of claim 16, wherein the filtering is based at least in part on scores of features presented in a feature vector.

18. The computer program product of claim 12, wherein parsing the query comprises parsing a sentiment search interest indication.

19. The computer program product of claim 12, wherein parsing the query comprises parsing group operator.

20. The computer program product of claim 12, wherein parsing the query comprises parsing a sentiment classifier indication.

21. The computer program product of claim 12, wherein sentiment analysis results are processed on a conceptual basis with respect to query terms that are not explicitly stated in the query language statement.

22. The computer program product of claim 21, further comprising using a thesaurus to search for the same related concepts.

23. A system comprising:
    a lexical query processor to receive a single database query language statement, the single database query language statement comprising both a lexical portion having one or more lexical terms and a sentiment clause portion, the sentiment clause portion comprising: a sentiment-aware operator corresponding to a particular sentiment sought after, wherein the sentiment-aware operator comprises a first parameter and a second parameter that are both contained within the sentiment-aware operator, the first parameter corresponding to one or more sentiment terms such that a sentiment analysis is performed for the one or more sentiment terms and the second parameter corresponding to a sentiment assessment indication term corresponding to the particular sentiment to be searched for relative to the one or more sentiment terms, wherein at least one of the one or more sentiment terms in the sentiment clause portion differs from the one or more lexical terms in the lexical portion;
    a query processor to parse the single database query language statement to identify the one or more lexical terms to be used in a retrieval of documents containing at least one of the one or more of the lexical terms; and
    a sentiment-aware query processor to parse the single database query language statement based at least on the sentiment-aware operator to identify the one or more sentiment terms for performing sentiment analysis and to identify the sentiment assessment indication term that pertains to the particular sentiment relative to the one or more sentiment terms, wherein the sentiment analysis is performed on the one or more sentiment terms found within the documents to identify the documents that pertain to the particular sentiment based at least in part on the sentiment assessment indication term after retrieving the documents that contain at least one of the one or more lexical terms.

24. The system of claim 23, further comprising a module to implement an entity extractor to extract a theme or name.

25. An apparatus comprising:
a document storage area; and
a computer configured to execute a sequence of instructions, the instructions having steps for,
parsing a single database query language statement, wherein the single database query language statement comprising both a lexical portion having one or more lexical terms and a sentiment clause portion, the sentiment clause portion comprising: a sentiment-aware operator corresponding to a particular sentiment sought after, wherein the sentiment-aware operator comprises a first parameter and a second parameter that are both contained within the sentiment-aware operator, the first parameter corresponding to one or more sentiment terms such that a sentiment analysis is performed for the one or more sentiment terms and the second parameter corresponding to a sentiment assessment indication term corresponding to the particular sentiment to be searched for relative to the one or more sentiment terms, wherein at least one of the one or more sentiment terms in the sentiment clause portion differs from the one or more lexical terms in the lexical portion;

receiving, from the document storage area, a set of documents containing the one or more terms from the lexical term portion; and after retrieving the documents that contain at least one of the one or more lexical terms, performing the sentiment analysis on the one or more sentiment terms found within the documents to identify the documents that pertain to the particular sentiment based at least in part on the sentiment assessment indication term.

26. The apparatus of claim 25, wherein the sentiment-aware processing comprises filtering sentiment analysis results based at least in part on a sentiment predicate.

27. The apparatus of claim 26, wherein the filtering is based at least in part on scores of features presented in a feature vector.

28. The apparatus of claim 25, wherein the sentiment-aware processing comprises grouping sentiment results by interest.

29. The apparatus of claim 25, wherein the sentiment-aware processing comprises using a sentiment classifier.

* * * * *

UNITED STATES PATENT AND TRADEMARK OFFICE
CERTIFICATE OF CORRECTION

PATENT NO. : 9,734,192 B2
APPLICATION NO. : 14/032587
DATED : August 15, 2017
INVENTOR(S) : Czarlinska et al.

Page 1 of 1

It is certified that error appears in the above-identified patent and that said Letters Patent is hereby corrected as shown below:

In the Specification

In Column 3, Line 46, after "results" insert -- . --.

Signed and Sealed this
Twenty-second Day of May, 2018

Andrei Iancu
*Director of the United States Patent and Trademark Office*